(12) United States Patent
Mann et al.

(10) Patent No.: US 7,731,491 B2
(45) Date of Patent: Jun. 8, 2010

(54) FUEL STORAGE DEVICES AND APPARATUS INCLUDING THE SAME

(75) Inventors: L. Chris Mann, Corvallis, OR (US); Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 866 days.

(21) Appl. No.: 10/274,393

(22) Filed: Oct. 16, 2002

(65) Prior Publication Data
US 2004/0076861 A1    Apr. 22, 2004

(51) Int. Cl.
*F23D 11/44*    (2006.01)
(52) U.S. Cl. .................. 431/262; 431/208; 429/20; 429/21; 429/24; 392/490
(58) Field of Classification Search .................. 429/20, 429/21, 22, 24, 26; 431/208, 207, 258, 262; 126/263.01; 392/490, 485; 219/201, 200; 48/197 FM
See application file for complete search history.

(56) References Cited

U.S. PATENT DOCUMENTS

| | | | | |
|---|---|---|---|---|
| 1,416,938 A | * | 5/1922 | Bowman | .................. 219/201 |
| 3,450,500 A | | 6/1969 | Setzer et al. | |
| 4,193,978 A | | 3/1980 | Muller et al. | |
| 4,225,320 A | | 9/1980 | Gell | |
| 4,354,822 A | * | 10/1982 | Madsen et al. | ............. 431/208 |
| 4,493,878 A | | 1/1985 | Horiba et al. | |
| 4,499,864 A | | 2/1985 | Lovercheck | |
| 4,866,250 A | * | 9/1989 | Pasbrig | ................. 431/208 |
| 5,432,023 A | | 7/1995 | Yamada et al. | |
| 5,504,471 A | | 4/1996 | Lund | |
| 5,644,342 A | | 7/1997 | Argyres | |
| 5,673,939 A | * | 10/1997 | Bees et al. | ................. 280/831 |
| 5,789,093 A | | 8/1998 | Malhi | |
| 5,795,668 A | | 8/1998 | Banerjee | |
| 5,797,269 A | * | 8/1998 | Nishimura et al. | ........... 62/46.2 |
| 5,804,329 A | * | 9/1998 | Amendola | .................... 429/34 |
| 5,812,156 A | | 9/1998 | Bullock et al. | |
| 5,939,033 A | * | 8/1999 | Kendall et al. | .............. 392/390 |
| 5,962,155 A | * | 10/1999 | Kuranaka et al. | ............. 429/20 |
| 5,976,725 A | * | 11/1999 | Gamo et al. | .................. 429/25 |
| 6,007,186 A | | 12/1999 | Erni | |
| 6,015,209 A | | 1/2000 | Barinaga et al. | |
| 6,039,430 A | | 3/2000 | Helterline et al. | |
| 6,054,228 A | | 4/2000 | Cisar et al. | |
| 6,057,051 A | | 5/2000 | Uchida et al. | |
| 6,089,687 A | | 7/2000 | Helterline | |

(Continued)

FOREIGN PATENT DOCUMENTS

DE    2728109 A1    1/1978

(Continued)

OTHER PUBLICATIONS

PCT International Search Report dated Dec. 7, 2004 for PCT app. Ser. No. PCT/US03/32791.

(Continued)

*Primary Examiner*—Steven B McAllister
*Assistant Examiner*—Sarah Suereth

(57) ABSTRACT

A fuel storage device in accordance with a present invention includes a fuel containing substance and a heater in thermal communication with the fuel containing substance.

27 Claims, 6 Drawing Sheets

U.S. PATENT DOCUMENTS

| | | |
|---|---|---|
| 6,113,208 A | 9/2000 | Benjamin et al. |
| 6,129,861 A | 10/2000 | Meusinger et al. |
| 6,198,250 B1 | 3/2001 | Gartstein et al. |
| 6,268,077 B1* | 7/2001 | Kelley et al. ............... 429/33 |
| 6,294,276 B1 | 9/2001 | Ogino |
| 6,530,233 B1* | 3/2003 | Nakamura et al. .......... 219/201 |
| 6,534,033 B1* | 3/2003 | Amendola et al. ....... 423/648.1 |
| 6,713,201 B2 | 3/2004 | Bullock et al. |
| 6,724,194 B1* | 4/2004 | Barton .................... 324/432 |
| 6,828,049 B2 | 12/2004 | Bullock et al. |
| 6,887,546 B2 | 5/2005 | Leban |
| 2001/0045364 A1 | 11/2001 | Hockaday et al. |
| 2001/0052433 A1 | 12/2001 | Harris et al. |
| 2002/0018925 A1 | 2/2002 | Celemin |
| 2002/0127447 A1* | 9/2002 | Edlund et al. ............... 429/19 |
| 2003/0008186 A1* | 1/2003 | Dickman et al. ............. 429/19 |
| 2003/0022041 A1 | 1/2003 | Barton et al. |
| 2003/0022042 A1 | 1/2003 | Wells et al. |
| 2003/0051785 A1 | 3/2003 | Gauthier et al. |
| 2003/0082426 A1 | 5/2003 | Bullock et al. |
| 2003/0082427 A1* | 5/2003 | Prasad et al. ............... 429/34 |
| 2003/0124408 A1 | 7/2003 | Hojo et al. |
| 2003/0129464 A1 | 7/2003 | Becerra et al. |
| 2003/0136453 A1 | 7/2003 | Johnson |
| 2003/0138676 A1 | 7/2003 | Leban |
| 2003/0138679 A1 | 7/2003 | Prasad et al. |
| 2004/0009121 A1* | 1/2004 | Jensen et al. ............ 423/648.1 |
| 2005/0079128 A1 | 4/2005 | de Vos et al. |

FOREIGN PATENT DOCUMENTS

| | | |
|---|---|---|
| EP | 0 940 260 | 9/1999 |
| EP | 1 253 522 | 10/2002 |
| EP | 1 353 393 | 10/2002 |
| EP | 1249427 A1 | 10/2002 |
| EP | 1 306 918 | 5/2003 |
| EP | 1396472 A2 | 3/2004 |
| GB | 1568374 A | 5/1980 |
| GB | 2283235 A | 5/1995 |
| JP | 09-213359 A | 8/1997 |
| JP | 10-321248 A | 12/1998 |
| JP | 2001-185184 A | 7/2001 |
| JP | 2001-295996 A | 10/2001 |
| JP | 2001-313047 A | 11/2001 |
| WO | WO-98/20282 A1 | 5/1998 |
| WO | WO 98/20282 A1 * | 5/1998 |
| WO | WO-00/24076 A | 10/1998 |
| WO | WO 00/35032 | 6/2000 |
| WO | WO01/79012 | 10/2001 |
| WO | WO-03/043112 A | 5/2003 |
| WO | WO-04/001883 A2 | 12/2003 |

OTHER PUBLICATIONS

PCT Written Opinion dated May 31, 2006 for Int. App. No. PCT/US03/32791.

* cited by examiner

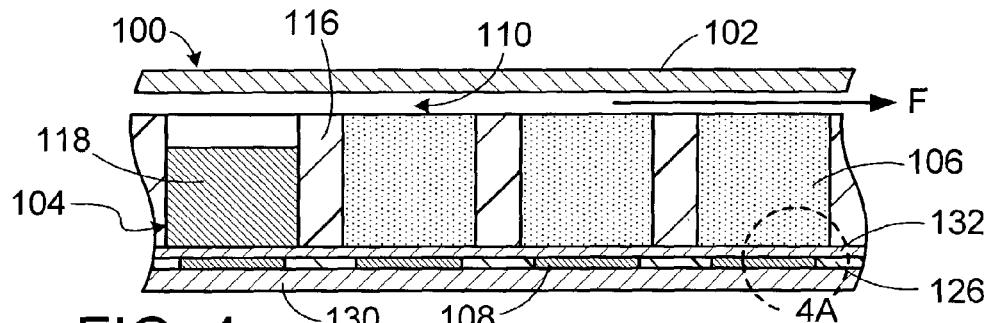
FIG. 4
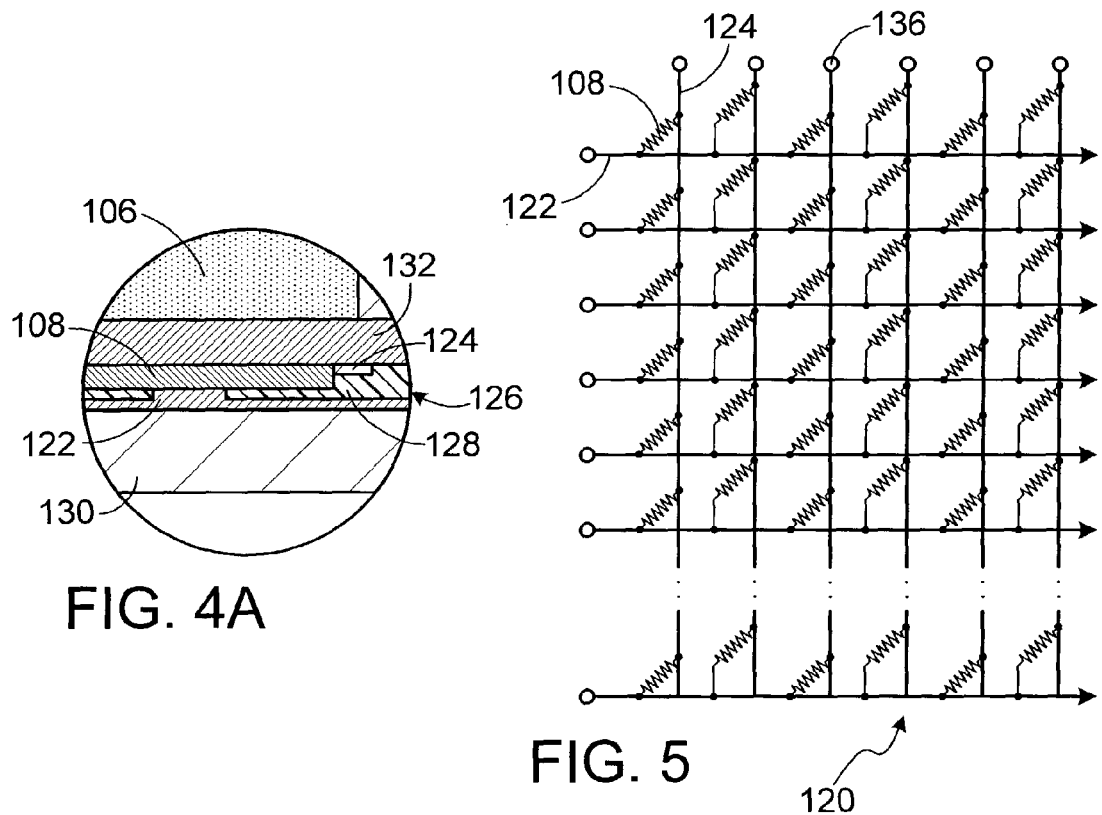
FIG. 4A
FIG. 5
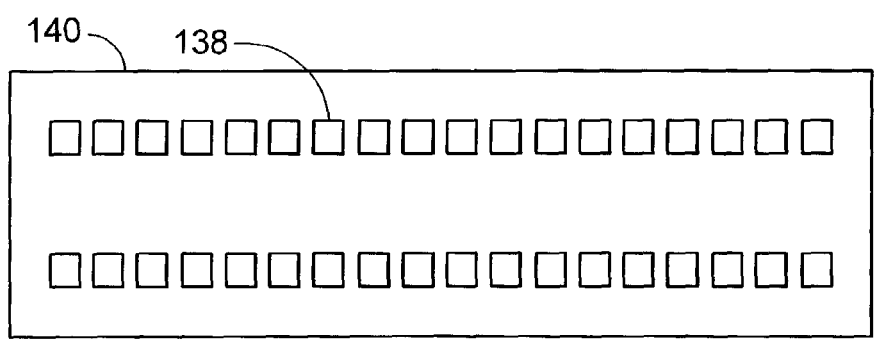
FIG. 6

FUEL STORAGE DEVICES AND APPARATUS INCLUDING THE SAME

BACKGROUND OF THE INVENTIONS

1. Field of the Inventions

The present inventions are related to fuel cartridges that may be used, for example, in combination with fuel cells.

2. Background

Many devices are fueled by fuel that is stored in a fuel cartridge. Although the present inventions are not limited to fuel cartridges that are used in conjunction with any particular type of device, fuel cells are one example of a device that may consume fuel stored in a fuel cartridge, and the present inventions are discussed in the context of fuel cells for illustrative purposes only. Fuel cells convert fuel and oxidant into electricity and a reaction product. Fuel cells that employ hydrogen as the fuel and oxygen as the oxidant, for example, produce water and/or water vapor as the reaction product. Fuel cartridges used in conjunction with fuel cells typically store pressurized gaseous fuel or a fuel containing substance, such as a chemical compound, that releases the gaseous fuel in the presence of water or a catalyst.

The inventors herein have determined that conventional fuel cartridges, especially those used in conjunction with fuel cells, are susceptible to improvement. More specifically, the inventors herein have determined that it can be undesirable to store large amounts of gaseous fuel (such as hydrogen) in a fuel cartridge because such storage can raise safety concerns and provide less than optimal energy density. The inventors herein have also determined that, in those instances where fuel containing substances are stored in a fuel cartridge, conventional apparatus for causing the gaseous fuel to be released do not provide precise control over the process. This lack of control can lead to the release of more fuel than is required by the fuel cell, which also raises safety concerns. Thus, the inventors herein have determined that it would be desirable to provide fuel cartridges that facilitate precise control over the conditions associated with the release of gaseous fuel from the fuel containing substance.

BRIEF DESCRIPTION OF THE DRAWINGS

Detailed description of preferred embodiments of the inventions will be made with reference to the accompanying drawings.

FIG. 4 is a section showing the plurality of exemplary fuel storage areas illustrated in FIG. 3 after fuel has been released from the fuel containing substance in one of the fuel storage areas.

FIG. 4A is an enlarged view of a portion of the exemplary embodiment illustrated in FIG. 4.

FIG. 5 is a schematic view of a resistor array in accordance with a preferred embodiment of a present invention.

FIG. 6 is a plan view of a contact plate in accordance with a preferred embodiment of a present invention.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. Additionally, although the inventions herein are discussed in the context of fuel cells and host devices powered by fuel cells, the fuel cartridges described herein are not limited solely to use with fuel cells. With respect to fuel cells, the present inventions are applicable to a wide range of fuel cell technologies, including those presently being developed or yet to be developed. Thus, although various exemplary fuel cartridges are described below with reference to a proton exchange membrane (PEM) fuel cell, other types of fuel cells, such as solid oxide fuel cells, are equally applicable to the present inventions. It should also be noted that detailed discussions of fuel cell structures, the structures of other fuel consuming devices, and the internal operating components of host devices powered thereby that are not pertinent to the present inventions have been omitted for the sake of simplicity.

Figure 1:
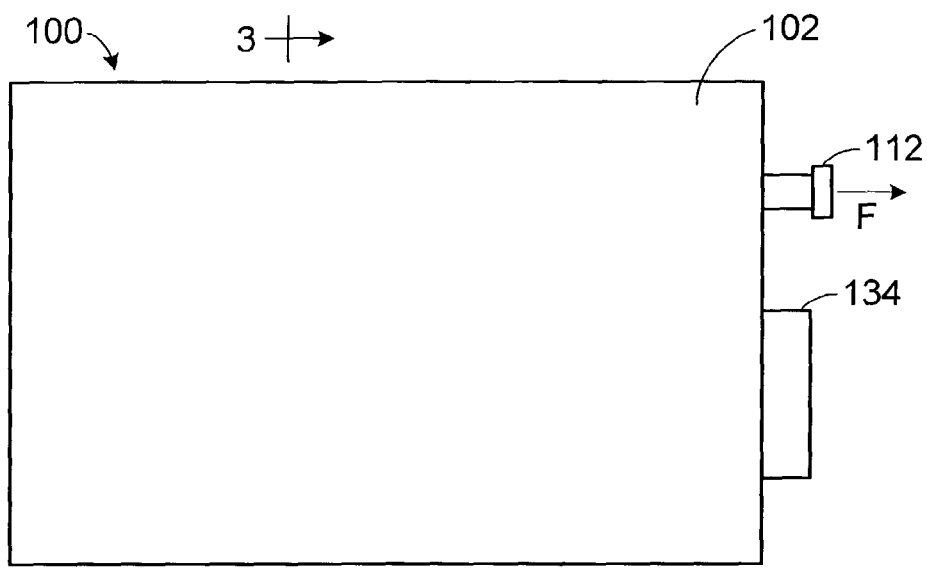
FIG. 1 is a plan view of a fuel cartridge in accordance with a preferred embodiment of a present invention.
Figure 2:
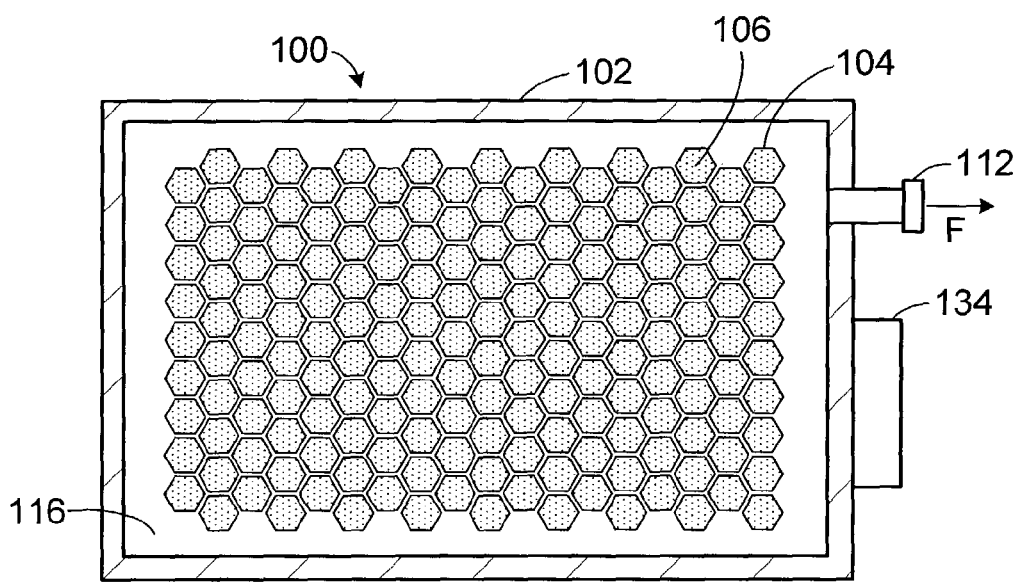
FIG. 2 is a plan, partial section view of the fuel cartridge illustrated in FIG. 1.
Figure 3:
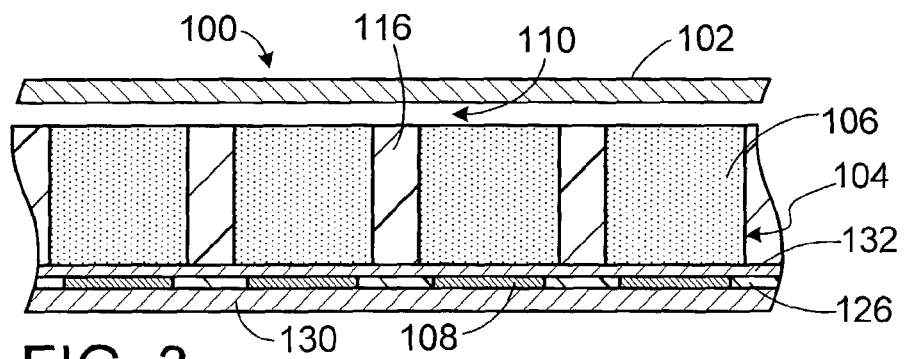
FIG. 3 is a section view taken along line 3-3 in FIG. 1 showing a plurality of exemplary fuel storage areas prior the release of fuel from the fuel containing substance.

As illustrated for example in FIGS. 1-3, a fuel cartridge 100 in accordance with one embodiment of a present invention includes a housing 102 and a plurality of fuel storage areas 104 that respectively store a quantity of a fuel containing substance 106. The fuel containing substance 106 is preferably a substance that will release gaseous fuel in response to the application of heat and a plurality of heaters 108 are provided to heat the fuel containing substance. The illustrated embodiment includes one heater 108 for each fuel storage area 104. Nevertheless, such an arrangement is not required and the heater/fuel storage area ratio may be varied from cartridge to cartridge or within a single cartridge. For example, there could be a plurality of heaters 108 for a single fuel storage area 104 or a single heater for a plurality of fuel storage areas. Fuel F, which is released from the fuel containing substance 106 into an open region 110 within the housing 102, exits the fuel cartridge 100 by way of a connector 112. The connector 112 also acts as a cap to prevent gas from entering or exiting the housing 102 unless the connector has mated with a corresponding connector 114 in the manner described below with reference to FIGS. 7 and 8.

There are a variety of advantages associated with such fuel cartridges and the fuel consuming systems that employ them. For example, the present inventions facilitate the storage of gaseous fuel in a non-gaseous state. This provides increased safety and energy density as compared to fuel cartridges that store fuel in a gaseous state. The present inventions also allow the release of fuel from a fuel containing substance 106 to be precisely controlled by simply controlling the actuation of the heaters 108. For example, individual heaters 108 may be actuated at predetermined intervals as long an fuel is being drawn from the cartridge 100. Alternatively, the host device may be used to calculate the amount of fuel required to, for example, power a fuel cell based on operating parameters such as current draw or voltage and actuate individual heaters 108 accordingly.

The fuel storage areas 104, which in the exemplary implementation are formed in a plate 116 positioned within the housing 102, may be of any suitable size, shape and number. The precision at which the cartridge 100 can produce gaseous fuel will increase with the number of fuel storage areas 104 (for a given overall volume of fuel containing substance 106 within the cartridge). Preferably, the density of the fuel storage areas 104 will be maximized by employing a shape that facilitates the minimization of the space between the fuel storage areas. Although the present inventions are not limited to any particular shape, the exemplary fuel storage areas 104 are hexagon-shaped and positioned in the array illustrated in FIG. 2. The plate 116 may be formed from, for example, plastics such as polystyrene, polycarbonate, and cross-linked acrylate, using an injection molding or casting process.

Although the present inventions are not limited to any particular fuel or fuel containing substance, one type of fuel containing substance is fuel containing chemical compounds that are used to provide hydrogen (the fuel used in the exemplary PEM fuel cell). Sodium borohydride, for example, is a stable compound in a solution or gel that will readily form hydrogen in the presence of heat, as illustrated by the following chemical equation: $NaBH_4 + 2H_2O \rightarrow 4H_2 + NaBO_2$. The solution should also contain a sufficient concentration of sodium hydroxide to prevent the formation of any appreciable amount of hydrogen during storage. Other exemplary fuel containing substances include borane hydrozene complexes and metal hydrides.

One end of each of the fuel storage areas 104 in the exemplary fuel cartridge 100 will be open so that the gaseous fuel can escape into the open region 110 from the fuel storage areas when the fuel containing substance 106 is heated. As such, the fuel containing substance 106 should be relatively viscous, i.e. viscous enough to remain in the fuel storage areas 104 without substantial leakage regardless of the orientation of the fuel cartridge 100. Suitably viscous fuel containing substances include gels and viscous solutions containing up to 40% sodium borohydride by weight, 0.1 to 15% gelling agent (such as a polyethylene amine of molecular weigh 2000 to 20000) by weight, and 0-10% aqueous sodium hydroxide by weight. This substance, which has an energy density of about 4000 watt-hour/kilogram, will form hydrogen when heated to about 110° C. to 150° C. Depending on the fuel containing substance employed, heating temperatures may range from 80° C. to 500° C.

During manufacture, the viscous fuel containing substance 106 may, for example, be pressed into the fuel storage areas 104. Any excess fuel containing substance 106 may then be scraped off of the surfaces of the plate 116.

As illustrated for example in FIG. 4, after the fuel containing substance 106 has been heated to release the gaseous fuel F, the remaining material will become a solid waste material 118 as it cools. This will prevent the waste material 118 from leaving the fuel storage areas 104 and interfering with the flow of the gaseous fuel F being released from the fuel containing substance 106 in the other fuel storage areas.

The exemplary heaters 108 are preferably resistors that may be selectively actuated, by driving current through the selected resistor(s), to generate heat that is applied to the fuel containing substance 106 in selected fuel storage areas 104. Other suitable heaters include, for example, tubes in a heat exchanger through which a heat transfer fluid flows. The storage areas 104, heaters 108 and plate 116 are respectively configured such that the actuation of a particular heater will only cause the fuel containing substance 106 associated with that heater to emit gaseous fuel and will not substantially heat the fuel containing substance (i.e. apply enough heat to cause the release of fuel) associated with other heaters. As illustrated for example in FIGS. 4A and 5, the heaters 108 are positioned in an array 120 that that corresponds to the array of fuel storage areas 104. The exemplary heater array 120, which is substantially similar to those employed in ink jet printing devices, is arranged in rows and columns and includes a first set of conductors 122 and a second set of conductors 124. Each heater 108 is connected to one of the conductors 122 and one of the conductors 124. A particular heater 108 in the exemplary array 120 is activated by connecting the corresponding conductor 122 to a voltage source and the corresponding conductor 124 to ground. Multiple heaters 108 may be simultaneously activated by connecting one conductor 122 to a voltage source and a plurality of conductors 124 to ground, by connecting a plurality of conductors 122 to a voltage source and a plurality of conductors 124 to ground, or by connecting a plurality of conductors 122 to a voltage source and a single conductor 124 to ground. Such an arrangement, which is sometimes referred to as a "passive multiplexing" arrangement in the ink jet printer context, preferably also includes additional resistors (not shown) that are used to dissipate parasitic power. One example of this type of resister arrangement is disclosed in the ink jet printer context in U.S. Pat. No. 5,504,471, which is assigned to the Hewlett-Packard Company and incorporated herein by reference.

It should be noted that the present inventions are not limited to any particular heater system. For example, resistors and/or other heater devices, may be controlled by way of an addressing system such as those disclosed in the ink jet printer context in commonly assigned U.S. Pat. Nos. 5,644,342 and 6,007,186, which are assigned to the Hewlett-Packard Company and incorporated herein by reference.

Referring more specifically to FIG. 4A, the heaters 108 and conductors 122 and 124 form part of a heater circuit layer 126 in the exemplary embodiment. The heaters 108 and conductors 122 and 124 are electrically isolated (except for the aforementioned connection of each heater to a pair of conductors) by insulating material 128. The circuit layer 126 may be formed on a base 130 by suitable techniques such as, for example, the metal deposition techniques described in "Development of the Thin-Film Structure for the ThinkJet Printhead," Hewlett-Packard Journal, May 1985, pps. 27-33. The base 130, which also forms part of the housing 102, is preferably formed from a polyimide plastic such as Kapton® that can maintain its mechanical, chemical and electrical properties over a wide range of temperatures. Once formed, the circuit layer 126 is covered by a barrier layer 132 that has relatively high thermal conductivity, but insulates the circuit layer both electrically and chemically from the fuel storage areas 104. Suitable materials for the barrier layer 132 include silica, silicon dioxide, silicon nitride, silicon carbide, glass, polymers such as polyimides, and epoxy-amine composites.

The exemplary fuel cartridge 100 also includes an electrical connector 134 (FIGS. 1 and 2) that is used to electrically connect the cartridge to a fuel consuming device. As illustrated for example in FIGS. 5 and 6, each of the conductors 122 and 124 includes an end 136 that is connected to a contact pad 138. The contact pads 138 are arranged in suitable fashion on a contact plate 140 that is carried by the electrical connector 134. The contact pads 138 mate with corresponding elements in an electrical connector 142 (FIG. 10) in the host device so that the host device can control the actuation of the heaters 108.

The size of the exemplary fuel cartridge 100 would, of course, vary in accordance with factors such as the size of the host device and the desired amount of fuel containing substance to be stored. Although the present inventions are not limited to any particular size, the exemplary fuel cartridge 100, which produces hydrogen from a sodium borohydride based fuel containing substance and is suitable for use in a notebook computer, carries about 100 milliliter (ml) of the fuel containing substance. Here, the housing 102 could, for example, be about 100 mm in length, about 50 mm wide and about 5 mm thick (with approximately 3 mm of the overall thickness being the plate 116 and approximately 0.5 mm being the open region 110). It is contemplated that, depending on the application and type of fuel containing substance, the size of the cartridge may be varied to accommodate from less than 10 ml of fuel containing substance for a small low power host device to 100 ml or more for a larger high power host device. Of course, these volumes may be increased or decreased as needed.

The exemplary fuel cartridge 100 and the portion of the host device that receives the fuel cartridge will preferably have corresponding shapes and a mechanical keying apparatus (not shown), such as a rail and slot arrangement, to prevent the fuel cartridge from being inserted improperly and, in many instances, prevent the wrong type of fuel cartridge from being connected the host device. A suitable locking device, such as a latch (not shown), may also be provided to hold the fuel cartridge in place. A relatively small fuel cartridge 100 (as compared to the host device) could be inserted into the host device, while relatively large fuel cartridges could be mounted on the exterior.

Although the present inventions are not limited to any particular arrangement for the connection of the fuel cartridge to the host device, the preferred arrangement is a self-sealing connector arrangement that prevents leakage. With such a self-sealing arrangement, seals will be maintained at the fuel cartridge connector 114 and the host device connector 116 when the two are connected to, and disconnected from, one another as the fuel cartridge is received by, and removed from, the host device. Once the sealed connection is made, fuel will be allowed to flow from the open region 110 to a fuel cell or other fuel consuming device under the conditions described below. Preferably, the connection will occur automatically when the fuel cartridge 100 is received by (e.g. inserted into or connected to) the host device to connect the fuel cartridge to the associated fuel consuming device.

Figure 7:
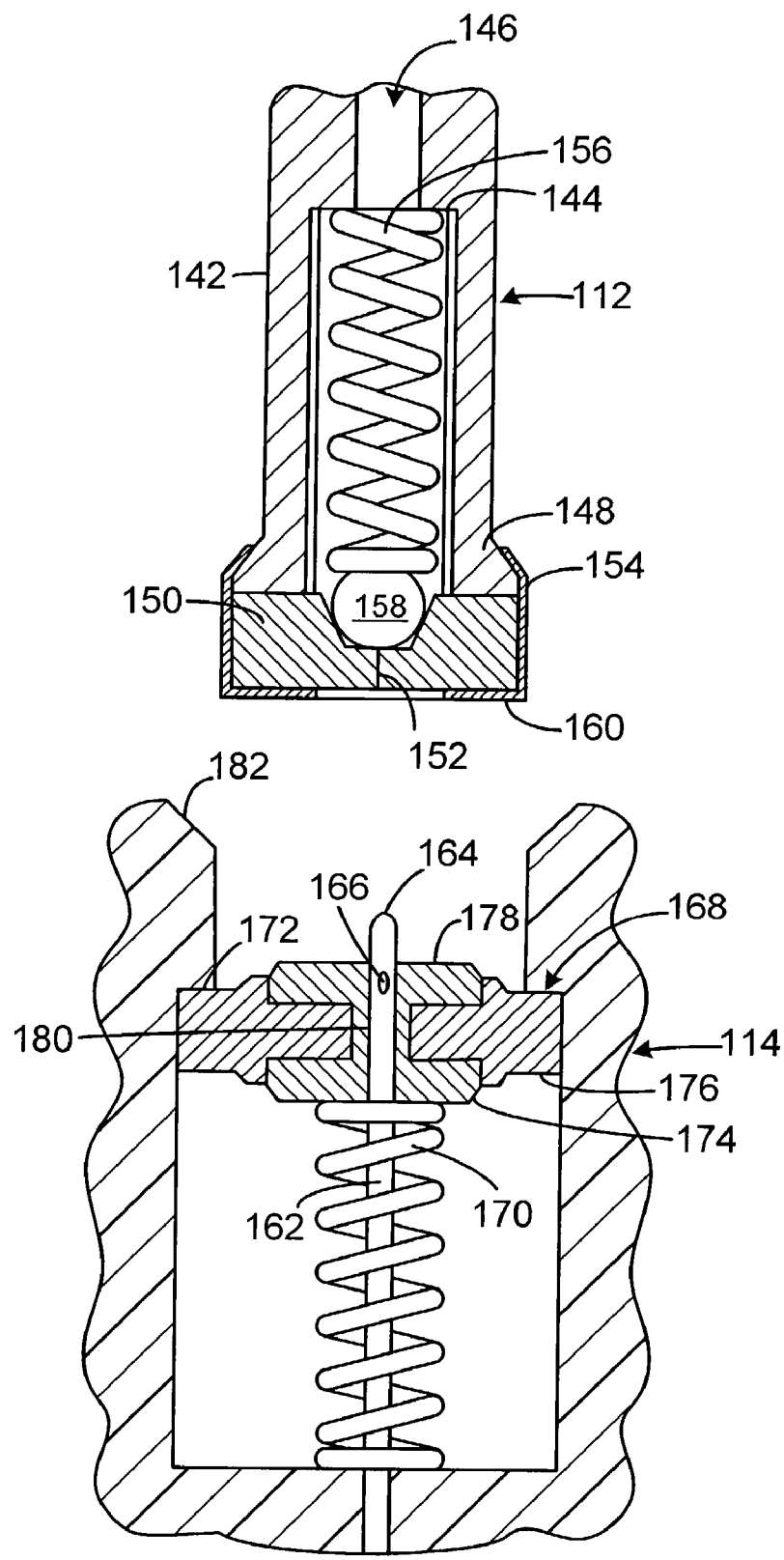
FIG. 7 is a partial section view of a connector arrangement in accordance with a preferred embodiment of a present invention in a disconnected state.
Figure 8:
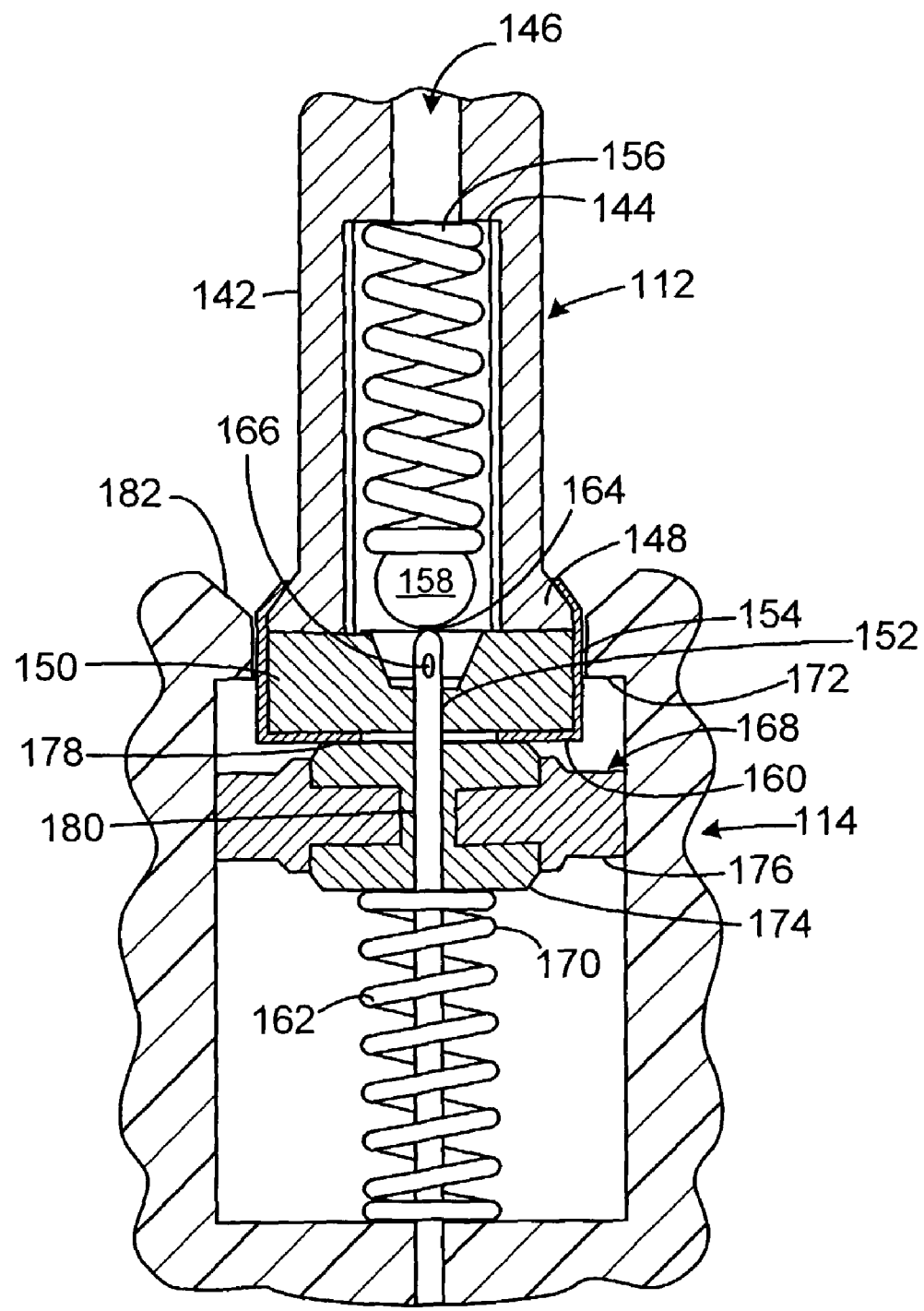
FIG. 8 is a partial section view of the connector arrangement illustrated in FIG. 7 in a connected state.

One example of a self-sealing connector arrangement that may be used in conjunction with the present inventions is illustrated in FIGS. 7 and 8. The exemplary fuel cartridge connector 112 includes a hollow cylindrical boss 142 having an inwardly projecting edge 144 and lumen 146 that opens into the open region 110 within the housing 102. The end 148 includes a compliant septum 150 with a slit 152 that is secured by a crimp cap 154. A spring 156 (or other biasing device) and a sealing ball 158 are positioned between the compliant septum 150 and the inwardly projecting edge 144. The length of the spring 156 is such that the spring biases the sealing ball 158 against the septum 150 to form a seal. The end 160 of the crimp cap 154 includes an opening that is aligned with the septum slit 152.

In the exemplary implementation illustrated in FIGS. 7 and 8, the host device connector 114 includes a needle 162 having a closed end 164, a lateral hole 166, and a bore that extends from the lateral hole axially through the needle. A sliding collar 168, which surrounds the needle 162 and is biased by a spring 170 (or other biasing device) against an annular stop 172, includes a compliant sealing portion 174 and a substantially rigid retaining portion 176. The compliant sealing portion 174 includes an exposed upper surface 178 and an inner surface 180 in contact with the needle 162. In the disconnected position illustrated in FIG. 7, the hole 166 is surrounded and sealed by the sealing portion inner surface 180. The host device connector 114 is also preferably provided with a tapered lead-in portion 182 that guides and centers the fuel cartridge connector 112 as it moves into the connected position illustrated in FIG. 8.

When the fuel cartridge connector 112 is inserted into the host device connector 114 (FIG. 8) in order to establish a connection between the fuel cartridge 100 and the host device, the closed end 164 of the needle 162 will pass through the septum slit 152. The septum 150 should, therefore, be compliant enough to allow the needle 162 to be inserted without large insertion forces, yet stiff enough to provide a tight seal when the needle is removed. As the needle 162 passes through the septum 150 into the cylindrical boss 142, the sliding collar 168 and sealing ball 158 will be urged in opposite directions until the hole 166 is exposed. This establishes communication between the fuel cartridge 100 and the host device. Additional details concerning the exemplary connector arrangement illustrated in FIGS. 7 and 8 may be found in U.S. Pat. No. 6,015,209, which is assigned to the Hewlett-Packard Company and incorporated herein by reference.

Figure 9:
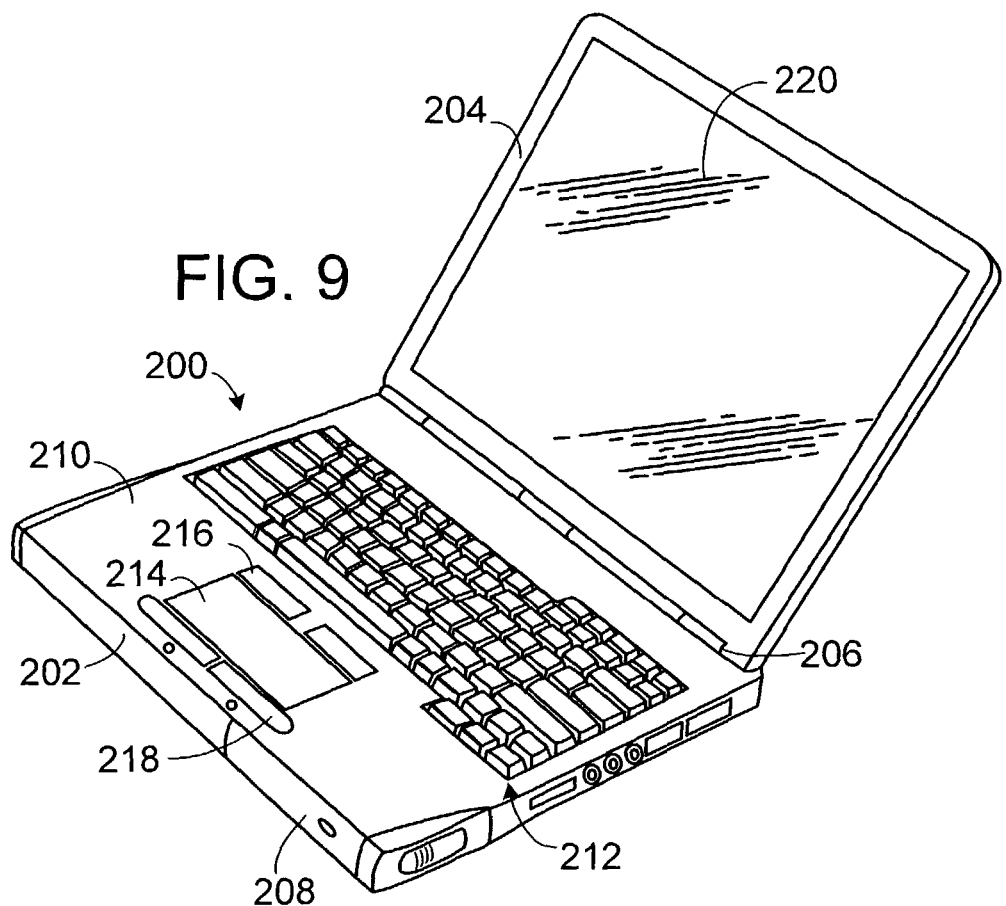
FIG. 9 is a perspective view of a notebook computer in accordance with a preferred embodiment of a present invention.
Figure 10:
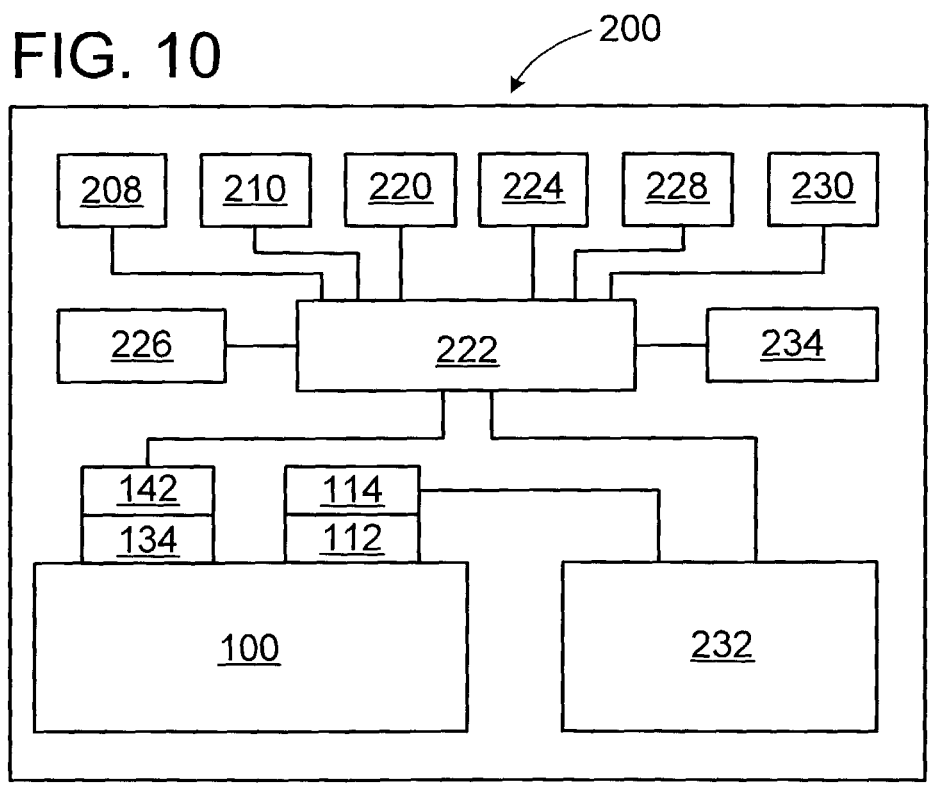
FIG. 10 is a schematic block diagram of a notebook computer and fuel cartridge in accordance with a preferred embodiment of a present invention.

Although the present inventions are not limited to use with any particular host device, the fuel cell powered notebook computer 200 illustrated in FIGS. 9 and 10 is one example of a host device having elements that consume electrical power, as well as a device that generates the electrical power, which may be fueled by the fuel cartridges described above. Other exemplary host devices include, but are not limited to, personal digital assistants, digital cameras, portable telephones and games. The present fuel cartridges may also be used in conjunction with stand alone power generators, such as the electrochemical cells described below with reference to FIGS. 11 and 12, that may be connected to separate power consuming devices in order to provide power thereto.

The exemplary notebook computer 200 is, with respect to many of the structural and operating components, substantially similar to conventional portable computers such as the Hewlett-Packard Omnibook 6000 notebook PC. More specifically, the exemplary portable computer 200 includes structural components such as a main housing 202 and a display housing 204 that is pivotably connected to the main housing by a hinge 206. The main housing 202 includes a module bay for optional modules such as the illustrated CD-ROM drive module 208, a 3.5 inch disk drive module, or a ZIP drive module. The exemplary main housing 202 is also provided with a user interface 210 that allows the user to interact with the computer 200. The user interface 210 includes a keyboard 212, a touch pad 214, a first pair of right/left click buttons 216 and a second pair of right/left click buttons 218. Each of these elements operates in conventional fashion to control the operations of the computer 200 and application programs running thereon. In addition to supporting a display 220, the display housing 204 also acts as a lid to cover the user interface 210 when in the closed position. To that end, a conventional latch arrangement (not shown) may be provided to lock the free end of the display housing 204 to the main housing 202 and maintain the display housing in the closed position.

The operating components of the exemplary computer 200 illustrated in FIGS. 9 and 10 include a CPU (or "processor") 222, cache and RAM memory 224, a power adapter and fan arrangement 226, a hard disk drive 228 and a modem 230. The exemplary portable computer 200 may also include other conventional components such as, for example, audio and video cards, headphone and microphone ports, serial, parallel and USB ports, keyboard and mouse ports, a 240-pin PCI connector for docking, an operating system such as Microsoft® Windows, and various application programs such a word processing, spreadsheets, security programs and games.

The exemplary notebook computer 200 also includes a fuel cell system 232, or other fuel consuming/power generating device, that is connected to various electrical loads within the computer. The exemplary fuel cell system 232 is a fuel cell stack consisting of a plurality of cells. Although the present inventions are not limited to any particular type of fuel cell system, the exemplary fuel cells are PEM fuel cells, which include an anode and a cathode separated by a PEM. Gaseous fuel, such as hydrogen, is supplied to the anode and oxygen supplied to the cathode. In the illustrated embodiment, oxygen may be supplied to the fuel cell stack by drawing ambient air into the stack through a vent in the housing 202. A fan may be provided to facilitate this process. The bi-product (water vapor and nitrogen in the exemplary embodiment) is carried away from the fuel cell system 232 by a manifold and vented out of the housing 202. The notebook computer 200 or other host device should also include a battery 234 to provide power prior to the initial transfer of fuel to the fuel cell system 232. Such power would be used to, for example, power the system processor prior to the production of power by the fuel cell system 232.

During operation of the exemplary computer 200, the heaters 108 in the exemplary fuel cartridge 100 will be selectively actuated by connecting them to a voltage source and ground within the computer, by way of the connectors 134 and 142, in order to provide fuel for the fuel cell system 232. The open region 110 may be filled with a small amount of pressurized fuel (such as hydrogen gas) during the fuel cartridge manufacturing process. This fuel, which will flow under pressure to the fuel cell system 232 when the connectors 112 and 114 mate, may be used to fuel the fuel cell system prior to actuation of the heaters 108. Alternatively, one or more of the heaters will have to be actuated, when the cartridge 100 is initially connected to the computer 200 or the first time the computer is used after the initial connection, in order to create a sufficient amount of pressurized fuel to fuel the fuel cell system 232. Actuation of the heaters 108 may be controlled by the system processor 222 (or a separate controller) along with the other components and subsystems (sometimes referred to as "balance of plant" components and systems) that control of the exemplary PEM fuel cell system. A feedback loop is one exemplary method of controlling the production of fuel within the fuel cartridge 100. Such control would include the rate of fuel production in addition to whether or not fuel is being produced at all.

The present inventions have also have application in the area of electrochemical cell devices, such as fuel cells and batteries, which may be used to power devices that consume electrical power (e.g. notebook computers, personal digital assistants, digital cameras, portable telephones and games). As illustrated for example in FIG. 11, an electrochemical cell device 300 in accordance with one embodiment of a present invention includes a housing 302, a fuel cartridge 100', a fuel cell stack 304 which receives fuel from the fuel cartridge and oxygen from ambient air that enters the housing by way of a vent, and a pair of contacts 306 and 308 that connect the stack to the host device. The electrochemical cell stack 304 may be any suitable stack, but is preferably a PEM-based stack of membrane electrode assemblies (MEAs).

Figure 11:
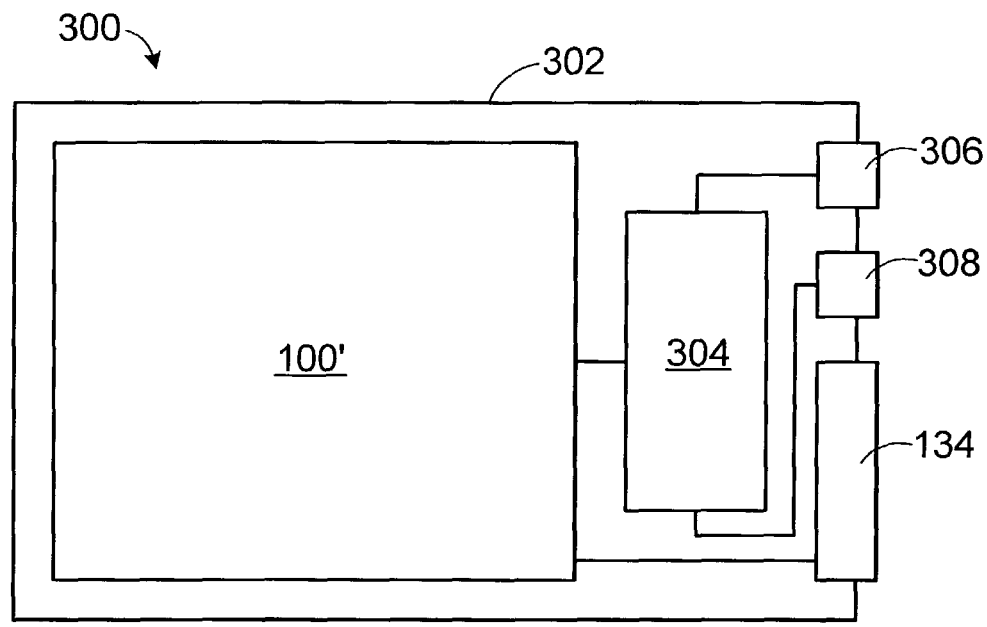
FIG. 11 is a schematic block diagram of an electrochemical cell device in accordance with a preferred embodiment of a present invention.

The fuel cartridge 100' is substantially similar to the cartridge 100 described above in that it includes a plurality of fuel storage areas 104 that respectively store a quantity of a fuel containing substance 106 and a plurality of heaters 108 to heat the fuel containing substance (not shown in FIG. 11). Here, however, the heaters 108 within the fuel cartridge 100' are actuated by way of an electrical connector 134' that is mounted on the housing 302, as opposed to the fuel cartridge itself. The fuel cartridge 100' may also be either removable or permanently positioned within the housing 302. In those instances where it is removable, the fuel cartridge 100' and fuel cell stack 304 may be respectively provided with mating connectors, such as the connectors 112 and 114 described above with respect to FIGS. 7 and 8.

Figure 12:
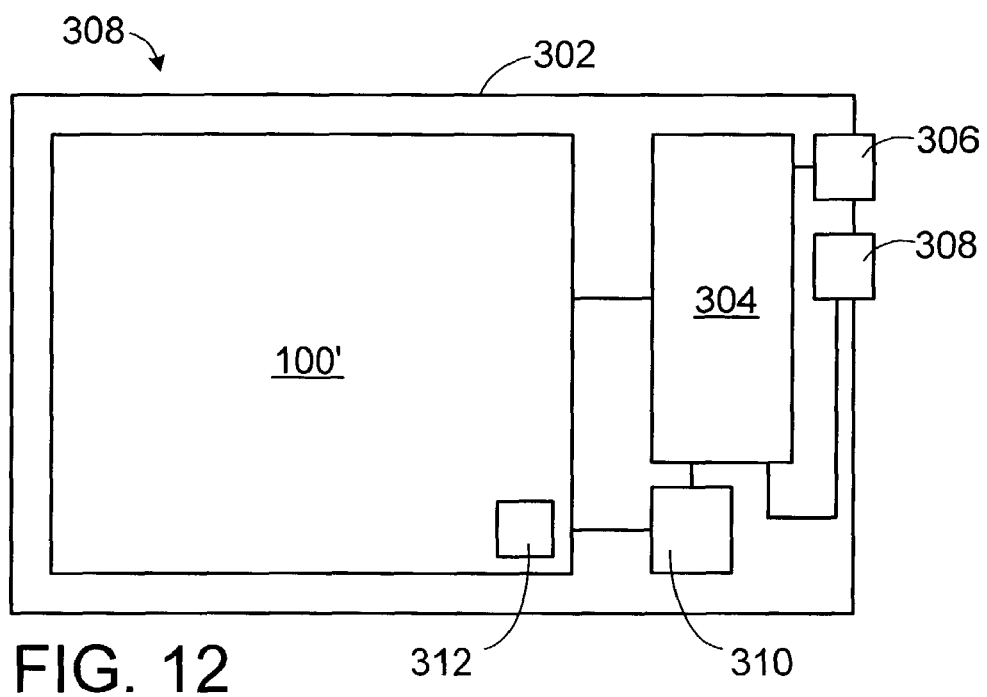
FIG. 12 is a schematic block diagram of an electrochemical cell device in accordance with a preferred embodiment of a present invention.

Another exemplary electrochemical cell device in accordance with a present invention is generally represented by reference numeral 308 in FIG. 12. The electrochemical cell device 308 is substantially similar to the electrochemical cell device 300 illustrated in FIG. 11 in that it includes a housing 302, a fuel cartridge 100', a fuel cell stack 304 and a pair of contacts 306 and 308. Here, however, the electrochemical device is self-controlling and self-actuating. As such, there is no need for an electrical connector to connect the heaters 108 (not shown in FIG. 12) to the host device. Instead, the exemplary electrochemical cell device 308 includes a controller 310 that controls the heaters 108 (and, therefore, the production of gaseous fuel) based on the load on the fuel cell stack 304. The exemplary electrochemical cell device 308 is also provided with a small battery 312, which may be recharged by the fuel cell stack 304, that provides the power for the heaters 108.

It should also be noted that the primary difference between fuel cells and batteries is simply that all of the fuel that will be consumed by a battery is initially present in the battery, whereas fuel cells have a replenishable fuel supply. Thus, the exemplary electrochemical cell devices 300 and 308 could also be referred to as "fuel cells" in those instances where the associated fuel cartridge 100' is replaceable, or as a "batteries" in those instances where the associated fuel cartridge 100' is not replaceable.

Although the present inventions have been described in terms of the preferred embodiments above, numerous modifications and/or additions to the above-described preferred embodiments would be readily apparent to one skilled in the art. By way of example, but not limitation, the various components of the exemplary fuel cartridges described above may be interchanged. Fuel cartridges in accordance with the present inventions may also include a fuel cell bi-product reservoir to store bi-product from the operation of the fuel cell in those instances where it is not practicable to vent the bi-product out of the host device. It is intended that the scope of the present inventions extend to all such modifications and/or additions.

We claim:

1. A fuel cartridge for use with a fuel consuming device that includes a fuel connector and an electrical connector, the fuel cartridge comprising:

a single housing, defining an interior and an exterior, including fuel connector and an electrical connector carried on the exterior of the single housing such that the fuel cartridge fuel connector and electrical connector will respectively mate with the fuel consuming device fuel connector and electrical connector when the fuel cartridge is inserted into the fuel consuming device;

a plurality of fuel storage areas located within the interior of the single housing that respectively store a fuel containing substance that releases fuel in response to the application of heat;

a plurality of heaters located within the interior of the single housing and individually associated with a respective fuel storage area and in thermal communication with the fuel containing substance in the respective fuel storage area; and circuitry, operably connected to the heaters and to the cartridge electrical connector, configured to individually control the heaters.

2. A fuel cartridge as claimed in claim 1, wherein the fuel containing substance is relatively viscous.

3. A fuel cartridge as claimed in claim 1, wherein the fuel containing substance comprises a sodium borohydride solution.

4. A fuel cartridge as claimed in claim 1, wherein the fuel containing substance comprises a gel containing sodium borohydride.

5. A fuel cartridge as claimed in claim 1, wherein the heaters comprise resistors.

6. A fuel cartridge as claimed in claim 1, wherein the circuitry comprises
a plurality of conductors and each heater is connected to two of the conductors.

7. A fuel cartridge as claimed in claim 6, wherein no two heaters are connected to the same two conductors.

8. A fuel cartridge as claimed in claim 6, further comprising:
an electrical connector connected to the conductors.

9. A fuel cartridge for use with a fuel consuming device that includes a fuel connector and an electrical connector, the fuel cartridge comprising:

a single housing, defining an interior and an exterior, including fuel connector and an electrical connector carried on the exterior of the single housing such that the fuel cartridge fuel connector and electrical connector will respectively mate with the fuel consuming device fuel connector and electrical connector when the fuel cartridge is inserted into the fuel consuming device;

a fuel containing substance that releases fuel in response to the application of heat located within the interior of the single housing; and a heater system, located within the interior of the single housing, in thermal communication with the fuel containing substance and electrically connected to the cartridge electrical connector, that selectively heats a first portion of the fuel containing substance located within the interior of the single housing in a first mode without substantially heating a second portion of the fuel containing substance located within the interior of the single housing and selectively heats the second portion of the fuel containing substance in a second mode without substantially heating the first portion of the fuel containing substance.

10. A fuel cartridge as claimed in claim 9, wherein the fuel containing substance is relatively viscous.

11. A fuel cartridge as claimed in claim 9, wherein the fuel containing substance comprises a sodium borohydride solution.

12. A fuel cartridge as claimed in claim 9, wherein the fuel containing substance comprises a gel containing sodium borohydride.

13. A fuel cartridge as claimed in claim 9, wherein the first and second portions of the fuel containing substance are respectively stored in first and second fuel storage areas.

14. A fuel cartridge as claimed in claim 9, wherein the heater system comprises a plurality of individually actuatable heaters.

15. A fuel cartridge as claimed in claim 14, wherein the plurality of individually actuatable heaters comprises a plurality of resistors.

16. A fuel cartridge, comprising:
a single housing defining an interior;
a plurality of spaced quantities of a fuel containing substance that releases fuel in response to the application of heat located within the interior of the single housing; and
heating means, located within the interior of the single housing and in thermal communication with the fuel containing substance, for selectively heating an individual quantity of the fuel containing substance within the interior of the single housing without substantially heating other quantities of the fuel containing substance within the interior of the single housing.

17. A fuel cartridge as claimed in claim 16, wherein the fuel containing substance is relatively viscous.

18. A fuel cartridge as claimed in claim 16, wherein the fuel containing substance comprises a sodium borohydride solution.

19. A fuel cartridge as claimed in claim 16, wherein the fuel containing substance comprises a gel containing sodium borohydride.

20. A fuel cartridge as claimed in claim 16, wherein the spaced quantities of the fuel containing substance are individually stored in respective storage areas.

21. A fuel cartridge as claimed in claim 1, wherein the fuel storage areas are configured such that the fuel containing substances in the respective fuel storage areas are not in contact with one another.

22. A fuel cartridge as claimed in claim 1, wherein the interior of the single housing includes an open region and the fuel containing substance in each of the fuel storage areas is exposed directly to the open region.

23. A fuel cartridge as claimed in claim 1, wherein
the single housing defines an interior surface; and
the interior of the housing includes an open region that extends from the interior surface of the single housing to the fuel containing substance in each of the fuel storage areas.

24. A fuel cartridge as claimed in claim 9, wherein the interior of the single housing includes an open region and the fuel containing substance is exposed directly to the open region.

25. A fuel cartridge as claimed in claim 9, wherein
the single housing defines an interior surface; and
the interior of the housing includes an open region that extends from the interior surface of the single housing to the fuel containing substance.

26. A fuel cartridge as claimed in claim 16, wherein the interior of the single housing includes an open region and each of the spaced quantities of fuel containing substance is exposed directly to the open region.

27. A fuel cartridge as claimed in claim 16, wherein
the single housing defines an interior surface; and
the interior of the housing includes an open region that extends from the interior surface of the single housing to each of the spaced quantities of fuel containing substance.

* * * * *